United States Patent
Friedrich et al.

(10) Patent No.: US 9,925,610 B2
(45) Date of Patent: Mar. 27, 2018

(54) METHOD FOR INSTALLING A FIRST MACHINE PART INTO A SECOND MACHINE PART

(71) Applicant: AKTIEBOLAGET SKF, Göteborg (SE)

(72) Inventors: Hans-Juergen Friedrich, Königsberg-Römershofen (DE); Helmut Hauck, Euerbach (DE)

(73) Assignee: AKTIEBOLAGET SKF, Gothenburg (SE)

( * ) Notice: Subject to any disclaimer, the term of this patent is extended or adjusted under 35 U.S.C. 154(b) by 376 days.

(21) Appl. No.: 14/418,600

(22) PCT Filed: Jul. 24, 2013

(86) PCT No.: PCT/EP2013/065623
§ 371 (c)(1),
(2) Date: Jan. 30, 2015

(87) PCT Pub. No.: WO2014/019913
PCT Pub. Date: Feb. 6, 2014

(65) Prior Publication Data
US 2015/0217392 A1    Aug. 6, 2015

(30) Foreign Application Priority Data
Jul. 31, 2012    (DE) .................. 10 2012 213 511

(51) Int. Cl.
*C21D 1/30*    (2006.01)
*B23K 1/00*    (2006.01)
(Continued)

(52) U.S. Cl.
CPC .............. *B23K 1/0006* (2013.01); *C21D 9/38* (2013.01); *F16C 19/54* (2013.01); *F16C 35/042* (2013.01);
(Continued)

(58) Field of Classification Search
CPC .............. Y10T 403/477; Y10T 403/478; Y10T 403/64; Y10T 403/7039; Y10T 29/49696;
(Continued)

(56) References Cited

U.S. PATENT DOCUMENTS 2,981,573 A * 4/1961 Reuter .................... F16C 33/20
277/565
5,212,343 A * 5/1993 Brupbacher ............ C06B 33/00
102/302
(Continued)

FOREIGN PATENT DOCUMENTS

DE    102004021349    11/2009
DE    102007020389    1/2014
WO    2008020036 A1    2/2008

*Primary Examiner* — Josh Skroupa
*Assistant Examiner* — Nahid Amiri
(74) *Attorney, Agent, or Firm* — Bryan Peckjian; SKF USA Inc. Patent Dept.

(57) ABSTRACT

A method for installing a first machine part into a second machine part includes press fitting the first machine part into the second machine part in its intended final position. The method also includes disposing an exothermically reactive substance on or in the first machine part and activating the exothermically reactive substance to cause a thermal structural change, stress relief, for example, in a part of the first machine part.

20 Claims, 2 Drawing Sheets

(51) Int. Cl.
- *F16C 35/077* (2006.01)
- *C21D 9/38* (2006.01)
- *F16C 19/54* (2006.01)
- *F16C 35/04* (2006.01)
- *C21D 1/18* (2006.01)
- *F16C 19/06* (2006.01)

(52) U.S. Cl.
CPC .............. *F16C 35/077* (2013.01); *C21D 1/18* (2013.01); *C21D 1/30* (2013.01); *F16C 19/06* (2013.01); *Y10T 29/49696* (2015.01); *Y10T 403/478* (2015.01)

(58) Field of Classification Search
CPC .. Y10T 29/49945; B23K 1/0006; C21D 1/18; C21D 1/30; C21D 9/38; F16C 19/54; F16C 35/042; F16C 35/077
USPC ...... 403/270, 271, 335, 361; 29/525, 898.07
See application file for complete search history.

(56) References Cited

U.S. PATENT DOCUMENTS

| | | | | |
|---|---|---|---|---|
| 5,967,402 A * | 10/1999 | Kuwabara | ............. | B23K 28/00 228/194 |
| 6,270,001 B1 * | 8/2001 | Tadic | ..................... | B23K 31/02 219/121.66 |
| 6,534,194 B2 | 3/2003 | Weihs et al. | | |
| 6,860,419 B2 * | 3/2005 | Simon | ....................... | F03G 7/06 228/234.3 |
| 6,991,856 B2 * | 1/2006 | Weihs | ................. | B23K 1/0006 228/107 |
| 7,103,974 B2 * | 9/2006 | Brandenstein | .......... | F16C 33/08 29/451 |
| 7,361,412 B2 * | 4/2008 | Wang | .................... | B23K 1/0006 228/245 |
| 7,491,950 B2 * | 2/2009 | Breyer | .................... | E04G 23/08 250/492.1 |
| 2001/0038029 A1 * | 11/2001 | Weihs | ................. | B23K 1/0006 228/117 |
| 2006/0144591 A1 * | 7/2006 | Gonzalez | ................ | E21B 29/10 166/277 |
| 2010/0242477 A1 * | 9/2010 | Duval | ....................... | C23C 4/18 60/645 |
| 2010/0308505 A1 * | 12/2010 | Welch | .................... | B29C 33/38 264/337 |
| 2011/0299800 A1 | 12/2011 | Seufert et al. | | |

* cited by examiner

METHOD FOR INSTALLING A FIRST MACHINE PART INTO A SECOND MACHINE PART

CROSS-REFERENCE

This application is the U.S. National Stage of International Application No. PCT/EP2013/065623 filed on Jul. 24, 2013, which claims priority to German patent application no. 10 2012 213 511.1 filed on Jul. 31, 2012.

TECHNOLOGICAL FIELD

The invention relates to a method for installing a first machine part into a second machine part.

BACKGROUND

In diverse applications a first machine part must be installed into a second. A bearing support which must be installed into a housing may be mentioned as an example. A bearing-support base body, for example, which is formed for receiving rolling-element bearings, provides such a concept. The bearing support is preinstalled, i.e. the rolling-element bearing is introduced into pot-type recesses of the bearing-support base body and fixed here. Then the complete bearing support is introduced into a round or similarly formed bore or opening in a housing. A press-fit must be present between the bearing support and the housing bore so that in later operation the bearing support has sufficient stability in the housing.

The required pressing-in of the preinstalled bearing support into the housing sometimes disadvantageously has here the consequence that stresses form in the material of the bearing support which can lead to tolerance changes. In this way losses in the quality and durability of the bearing assembly in turn result.

SUMMARY

The object underlying the invention is to propose a method of the above-described type by which it is possible to gently eliminate states of stress taking place in the material of the first machine part during the installation process. This should occur such that, in particular, adjacent components—such as, in particular, heat-sensitive rolling-element bearings—are not excessively thermally loaded.

The solution of this object by the invention is characterized in that the method includes the steps:

a) installing of the first machine part into the second machine part in its intended final position;

b) activating of an exothermically reacting substance, which is disposed on the side of, on the underside of, on top of, or in the first and/or the second machine part, in order to cause a thermal structural change in a part of the first machine part.

The invention thus prepares the first machine part to undergo a heat treatment in the broadest sense after its installation. Stresses which originate from the installation process itself can thus be eliminated in the installed state.

Here the exothermically reacting substance can be disposed on the side of, on the underside of, on top of, or in the first and/or second machine part before or after the carrying out of step a); however, it is also possible that it is disposed on the side of, on the underside of, on top of, or in the first and/or second machine part in conjunction with the carrying out of step a).

The thermal structural change is primarily a stress relief heat treatment. However, it is also possible that the thermal structural change is part of another heat treatment process, for example a soft annealing. It is also possible that the thermal structural change is part of a hardening, annealing, or stabilizing process. A tempering process may be mentioned as an example.

The exothermically reacting substance can be applied as a layer on the side of, on the underside of, on top of, or in the first and/or second machine part. For this purpose it can also be applied to a carrier element wherein the carrier element is then disposed on the side of, on the underside of, on top of, or in the first and/or second machine part. Accordingly the substance can thus also be directly applied to the machine part or indirectly via a carrier.

If the heat treatment has taken place, i.e. if the exothermically reactive substance has chemically reacted, residues of the reacted substance can be removed if necessary.

A preferred but by no means exclusive application of the proposed method is installing a bearing support into a second machine part which second machine part may comprise a housing.

The exothermically reacting substance can be comprised of a reactive nanocrystalline material. The initiating of the exothermic reaction in the, for example, reactive nanocrystalline layer can occur by passing an electric current through the substance.

Here the exothermically reacting substance can be introduced or applied as a separate structure onto the first and/or second machine part.

In the case that the first machine part is embodied as a bearing support, at least one circular opening for the receiving of the bearing ring of a rolling-element bearing can be provided wherein the exothermically reacting layer can be disposed along the circumference of the circular opening or along a part of the circumference. The bearing-support base body is comprised in particular of metal plate.

A possible embodiment of the exothermically reacting substance is one which uses nickel (Ni) and aluminum (Al). For details concerning such a substance explicit reference is made to U.S. Pat. No. 6,991,856 B2, where reactive nanocrystalline layers used are described and disclosed in detail. The reactive nanocrystalline layers provided are preferably foils which include a plurality of thin layers which can function as a local heat source. Layers of this type are commercially available, for example, under the designation NanoFoil® from the firm Reactive Nano Technologies Inc., USA. The layer mentioned represents a thermally unstable layer which can be melted during activation, for example by the conducting of an electrical current. However it is also possible to apply the exothermically reacting substance in the form of pasty material instead of foils.

The exothermically reacting substances used can be provided as layers—for example by applying or introducing the reactive nanocrystalline foils mentioned. Alternatively it is also possible by using known coating methods (such as are known, for example, under the designation PVD) to apply a layer made from reactive nanocrystalline material directly on at least one part of the first and/or second machine part.

The proposed method thus makes available a solution by which components—in particular of drive technology—can be heat-treated after their installation. The need therefor arises primarily due to the installation process itself, i.e. during the installation local stresses are generated by the pressing processes, which local stresses can lead to tolerance changes. These stresses are again gently eliminated by the inventive proposal.

The inventive concept prepares for the local applying of an exothermically reacting substance which can be used as a layer or generally in the form of particles. A stress reduction can thereby occur in a very targeted and narrowly bounded manner, without affecting thermally sensitive surrounding-regions or -parts (for example a rolling-element bearing).

Any other eliminating of the stresses in the first machine part is sometimes difficult or impossible, since there is no other possibility for this purpose in the installed situation than the possibility according to the invention. However, the invention makes possible a stress relief heat treatment after installation without this being disadvantageous for other components or subassemblies.

Since the exothermic reaction usually proceeds very quickly and furthermore—as explained—can be limited only to the component regions which require the heat treatment, the heat treatment is possible on already-installed subassemblies, wherein adjacent components or elements are not affected thermally or with respect to their structure.

Neither stationary furnaces nor mobile heating equipment is required for the inventive process.

It is further advantageous that the proposed method is simply integratable in an automated installation process. This also applies for a manual process wherein the components can then be warm to the touch.

Finally the method is realizable without high cost expenditures.

The invention proposal can be used in any application. The type of heat treatment—whether stress relief heat treatment or other heat-treatment-, annealing-, stabilizing-, and hardening-process—is also possible in a wide range.

BRIEF DESCRIPTION OF THE DRAWINGS

An exemplary embodiment of the invention is depicted in the drawings.

DETAILED DESCRIPTION

Figure 1:
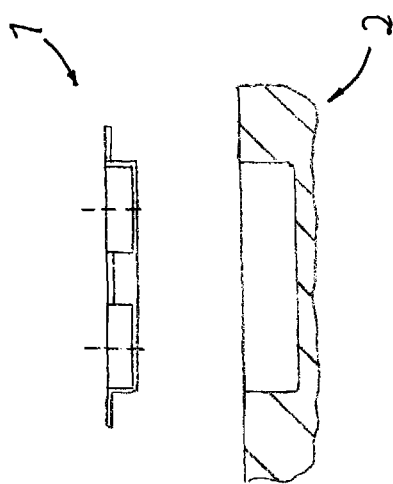
FIG. 1 schematically shows a first machine part in the form of a bearing support which is to be installed into a second machine part in the form of a housing, wherein the parts are not yet connected to each other.

In FIG. 1 a first machine part 1 in the form of a bearing support is visible which is to be installed into a second machine part 2 in the form of a housing. Details for the construction of the bearing support 1 and of the housing 2 arise from FIG. 3. Thereafter the bearing support 1 includes a bearing-support base body 4 which includes pot-shaped recesses for receiving two rolling-element bearings 5. The rolling-element bearings 5 are fixed in the bearing support 1. The entire and thus-far preassembled bearing support 1 is then installed in a bore 6 in the housing 2 by pressing-in the bearing support 1 axially into the bore 6.

Figure 2:
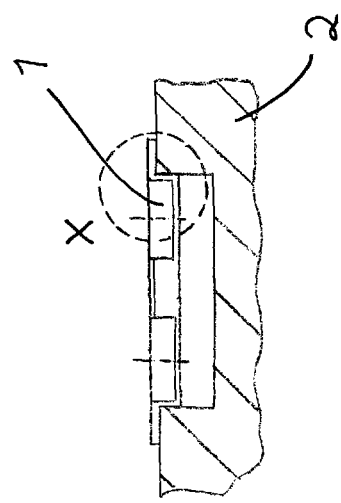
FIG. 2 shows the first and second machine part according to FIG. 1, wherein the parts have now been installed.

While FIG. 1 still shows the preassembled bearing support 1 before the installation into the housing 2, according to FIG. 2 it has been pressed into the bore 6 of the housing 2. As a result, stresses have arisen in the material of the bearing-support base body 4 which are disadvantageous with respect to the quality of the bearing assembly as well as their service life.

Figure 3:
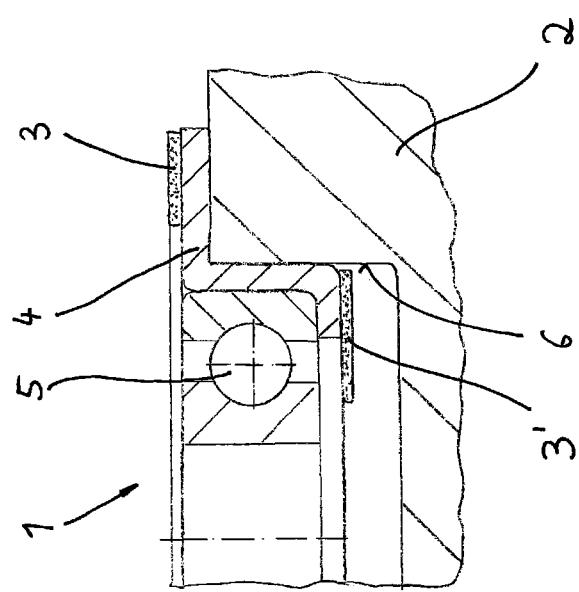
FIG. 3 shows the detail "X" according to FIG. 2, wherein here an exothermically reacting substance is depicted, using which a stress relief heat treatment takes place.

The stresses in the material of the bearing-support base body 4 are inventively relieved as follows: as can be seen in FIG. 3 an exothermically reacting substance 3 is applied on the bearing-support base body 4 in regions wherein stresses are to be expected. Here another, second exothermically reacting substance 3' is drawn in which can optionally be used.

This substance 3 or 3' is distributed on the bearing-support base body 4 so as to correspond to the locations of the stresses to be removed. Subsequently the substance 3 or 3' is activated such that an exothermic process takes place which locally heats the material of the bearing-support base body 4.

A stress relief heat treatment thereby occurs in the material of the bearing-support base body 4, i.e. the stresses generated by the installation process are removed again.

In this way it is also possible that local hardening processes can be performed so that, for example, the material of the bearing-support base body 4 can be hardened at desired locations.

It is very advantageous that the heat supplied locally by the substance 3 or 3' is not radiated or conducted as far as into the adjacent rolling-element bearing 5, so that the temperature-sensitive bearing is treated gently during the process mentioned.

REFERENCE NUMBER LIST

1 First machine part (bearing support)
2 Second machine part (housing)
3 Exothermically reacting substance
3' Exothermically reacting substance
4 Bearing-support base body
5 Rolling-element bearing
6 Bore

The invention claimed is:

1. A method comprising:
a) installing a first machine part, comprising a cylindrical wall having a top edge and a bottom edge and a flange projecting radially outward from the top edge and a base wall extending radially inward from the bottom edge, into an opening having a side wall in a second machine part in an intended final position such that the cylindrical wall forms a press fit with the side wall of the opening of the second machine part and such that the flange contacts the second machine part at a location outside the opening;
b) disposing an exothermically reactive substance on an upper surface of the flange or on a lower surface of the base wall; and
c) activating the exothermically reactive substance in order to cause a thermal structural change in a part of the first machine part.

2. The method according to claim 1, wherein step b is performed before step a.

3. The method according to claim 1, wherein step b is performed after step a.

4. The method according to claim 1, wherein the thermal structural change is a stress relief heat treatment.

5. The method according to claim 1, wherein the thermal structural change is part of a hardening process.

6. The method according to claim 1, wherein the exothermically reactive substance is applied as a layer.

7. The method according to claim 1, wherein the first machine comprises a bearing housing and a bearing including an inner ring, an outer ring and a plurality of rolling elements mounted in the housing.

8. The method according to claim 1, wherein the exothermically reactive substance is disposed on or in the flange and the base wall.

9. The method according to claim 1, wherein the cylindrical wall directly contacts the side wall of the opening of the second machine part.

10. The method according to claim 9, wherein the exothermically reactive substance does extend between the cylindrical wall and the side wall of the opening.

11. The method according to claim 1, wherein the cylindrical wall of the first machine part is metal.

12. The method according to claim 1, wherein the installing creates a stress in the first machine part and wherein the thermal structural change comprises a relief of the stress.

13. A method for installing a bearing unit in an opening in a body, the opening having a side wall, the method comprising:
   a) press-fitting the bearing unit in the opening in an intended final position, the bearing unit comprising a housing having a cylindrical wall having an inner surface and an outer surface and a bearing comprising an outer ring in contact with the inner surface, the bearing further including an inner ring and a plurality of rolling elements,
   b) applying an amount of exothermically reactive substance to the bearing unit housing at a location spaced from the cylindrical side wall, and
   c) relieving stress in the bearing unit by activating the exothermically reactive substance to cause a thermal structural change in the housing.

14. The method according to claim 13,
   wherein the bearing housing includes a flange projecting radially outward from a first edge of the cylindrical wall and a base wall projecting radially inward from a second edge of the cylindrical wall,
   wherein the flange contacts the body, and
   wherein the exothermically reactive substance is applied to the flange or to the base wall.

15. The method according to claim 13, wherein the outer surface of the cylindrical wall directly contacts the body.

16. The method according to claim 15, wherein the exothermically reactive substance does extend between the outer surface of the cylindrical wall and the side wall of the opening in the second machine part.

17. The method according to claim 13, wherein the housing is metal.

18. The method according to claim 17, wherein the housing includes a flange projecting radially outward from the cylindrical side wall, the flange directly contacting the body at a location outside the opening and the method including disposing the exothermically reactive substance on the flange.

19. The method according to claim 13, wherein the press fitting creates a stress in the bearing unit and wherein the thermal structural change comprises a relief of the stress.

20. A method comprising:
   providing a housing comprising a cylindrical side wall having an inner surface and an outer surface and a base wall extending radially inward from a first edge of the cylindrical side wall, the base wall having an inner surface and an outer surface, the inner surface of the cylindrical side wall and the inner surface of the base wall defining a housing interior,
   inserting the housing base-wall-first into an opening in a body such that the outer surface of the cylindrical side wall directly contacts and forms a press fit with the opening, the inserting creating a stress in the housing,
   disposing an exothermically reactive substance on the outer surface of the base wall, and
   at least partially relieving the stress by activating the exothermically reactive substance.

* * * * *